United States Patent [19]
Stoddard II

[11] Patent Number: 5,903,453
[45] Date of Patent: May 11, 1999

[54] METHOD FOR ESTIMATING SOFTWARE OPERATION AND PERFORMANCE USING A GOAL-QUESTION-METRIC PARADIGM

[75] Inventor: Robert William Stoddard II, Allison Park, Pa.

[73] Assignee: Texas Instruments Incorporated, Dallas, Tex.

[21] Appl. No.: 08/588,062

[22] Filed: Jan. 19, 1996

[51] Int. Cl.⁶ .................................................. G06F 11/00
[52] U.S. Cl. ..................... 364/184; 364/401 R; 364/488; 364/282.1; 395/183.01; 395/183.13; 395/183.14; 395/185.01
[58] Field of Search .............................. 364/551.01, 183, 364/184, 401 R, 488, 282.1; 395/183.01, 183.13, 185.01, 183.14, 906, 68, 600, 700

[56] References Cited

U.S. PATENT DOCUMENTS

| | | | |
|---|---|---|---|
| 4,763,277 | 8/1988 | Ashford et al. | 364/513 |
| 4,928,704 | 5/1990 | Hardt | 128/732 |
| 5,406,956 | 4/1995 | Farwell | 128/731 |
| 5,446,895 | 8/1995 | White | 395/650 |
| 5,465,321 | 11/1995 | Smyth | 395/22 |
| 5,500,941 | 3/1996 | Gil | 395/183.14 |

OTHER PUBLICATIONS

Modarres, M., *What Every Engineer Should Know About Reliability and Risk Analysis*, Marcel Dekker, Inc. New York 1993, pp. 142–154, 268–276.

Bowen, T., Wigle, G., Tsai, J., "Specification of Software Quality Attributes —Software Quality Specification Guidebook", Rome Air Development Center, RADC–TR–85–37, vol. 1, Final Technical Report, Feb. 1985.

Robert W. Stoddard, "An Extension Of Goal–Question–Metric Paradigm For Software Reliability", IEEE, 1996 Proceedings Annual Reliability and Maintainability Symposium, May, 1996, pp. 156–162.

H. Dieter Romback, et al., "Improving Software Maintenance Through Measurement", Proceedings of the IEEE, vol. 77, No. 4, Apr. 1989, pp. 581–595.

Anonymous, "Real–Time Data Acquisition and Analysis System", IBM Technical Disclosure Bulletin, vol. 33, No.3A, Aug. 1990, pp. 284–289.

David Burns, et al., "Reliability and Life Cycle Cost Evaluation for System Design", Safety and Reliability '92, Jun. 1989 pp. 353–367.

Basili, Victor R., "Software Modeling and Measurement: The Goal/Question/Metric Paradigm," Computer Science Technical Report CS–TR–2956, UNIMACS–TR–92–96, dated Sep. 1992, University of Maryland at College Park, pp. 1–24.

U. S. Nuclear Regulatory Commission, "Fault Tree Handbook", NUREG–0492, published Jan. 1981. National Technical Information Service, Springfield, VA.

*Primary Examiner*—Emanuel T. Voeltz
*Assistant Examiner*—Hien Vo
*Attorney, Agent, or Firm*—Robert L. Troike; W. James Brady, III; Richard L. Donaldson

[57] ABSTRACT

The present invention is a method for estimating software operation and performance measures using a goal/question/metric paradigm. In the present invention, each goal is associated with questions and metrics and stored to memory as a tree. The nodes in the tree are then interconnected in accordance with boolean logic relationships. A minimal path is determined through the tree. Probabilities are then assigned to each node and used in assigning an overall probability to the top node or goal. A percentage contribution to the overall probability is then assigned to each node. The probabilities, minimal path and percentage contributions are then used in determing an action plan to use during development of the software to ensure software operation and performance accordingly.

7 Claims, 5 Drawing Sheets

METHOD FOR ESTIMATING SOFTWARE OPERATION AND PERFORMANCE USING A GOAL-QUESTION-METRIC PARADIGM

TECHNICAL FIELD OF THE INVENTION

This invention relates to software engineering and more particularly to a method for estimating software operation and performance measures using a goal-question-metric paradigm.

BACKGROUND OF THE INVENTION

A driving need in analyzing and improving software operation and performance is for measures such as Software Reliability to mature the "physics of failure" and design aspects related to software reliability. This type of focus would then enhance one's ability to effect reliable software in a predictable form. A major challenge is that software reliability, in essence, requires one to measure compliance to customer/user requirements. Customer/user requirements can range over a wide spectrum of software product attributes that relate directly or indirectly to software performance. Identifying and measuring these attributes in a structured way to minimize risk and allow pro-active preventive action during software development is no easy task. The Goal-Question-Metric paradigm, discussed by Basili [see V. R. Basili, "Software Modeling and Measurement: The Goal/Question/Metric Paradigm", University of Maryland at College Park Computer Science Technical Report UMIACS-TR-92-96, 1992 Sep, pp 1–24 (herein referred to as "Basili")], is one popular and effective approach to measurement identification. However, in practice, additional challenges in using this approach have been encountered. Some of these challenges, though, seem to be alleviated with use of a reliability technique called success/fault tree analysis. Experience has shown that the Goal-Question-Metric paradigm is conducive to the building of G-Q-M trees which may be analyzed using reliability success/fault tree logic.

A number of working sessions were held to identify an initial, standard set of software metrics for use across our projects. Participants included software team leaders, software managers, software engineering process group members and software quality assurance staff. It was decided that the software measures should be goal-driven to ensure that there was both an "owner" of the metric and a method of determining if, and when, the metric had outlived it's usefulness. Basili's Goal/Question/Metric paradigm was used as a process guide within the working sessions. However, during facilitation of these sessions, a number of obstacles were encountered. These obstacles included the following:

1) Participants had different definitions of reliability and quality;
2) Participants had different organizational perspectives on the same goal, question or metric;
3) Participants wanted a way to quantitatively assess, overall, how they were progressing when faced with a large number of product attributes related to quality and reliability;
4) Participants were not current on the literature related to definitions of reliability metrics and relationships of metrics;
5) Participants were quite often short on patience in brainstorming compatible Goals, Questions and Metrics that fit their situation;
6) Participants quickly saw complexities such as goal tradeoffs, competing and conflicting goals, and the need for a dynamic model to handle changing Goal/Question/Metric desires;
7) Participants realized that different Questions and Metrics, related to reliability and quality, were sometime heavily influenced depending on the data already collected by the projects;
8) Participants desired the ability to select Goal/Question/Metric groupings that would minimize the total number of data primitives to be collected; and
9) To save time and frustration, participants desired a strawman of a Goal/Question/Metric taxonomy to aid in preparation prior to each working session.

From this experience, several lessons-learned were apparent. First, the need to become more knowledgeable of the detailed workings of the Goal/Question/Metric paradigm [see Basili]. Second, the need to identify a goal flow-down methodology within the organization so that the paradigm could be applied within organizational levels. Third, the need for a detailed process for determining how to originate questions for specific goals, and how to originate metrics for specific questions. Fourth, the need for a way to make the Goal/Question/Metric result actionable in a variety of situations.

The Goal/Question/Metric paradigm [see Basili] is directed at the development of a set of corporate, division and project goals related to different business measures such as customer satisfaction, quality, financial progress, technical performance, etc. The paradigm includes: 1) a process of identifying goals followed by 2) the generation of questions that help define the goals which is then followed by specifying 3) specific measures to answer the questions. Inherent in the paradigm is the additional focus on developing mechanisms for data collection, validation and analysis, and taking action on the results.

Organizations implementing this paradigm in the development of their measurement program gain lift in many ways:

1) Support for project planning and control;
2) Determination of strengths and weaknesses;
3) A rationale for the adoption and refinement of various software engineering techniques or methods;
4) Permits assessment of the impact of changes in techniques and methods; and
5) Support for evaluation of both software processes and products.

However, an important benefit of implementing this paradigm is that it keeps the focus on why the metrics are being collected.

In practice, goals are specified at an organizational level and then tailored and integrated into the organizational process and product models - based on the needs of the organization. In this manner, goals may be traced to data and data may be interpreted to understand goal performance. Templates are identified in Basili to provide guidance in the formulation of the goals, questions and metrics.

Goals were identified to possess five attributes: 1) the object of interest, 2) the purpose of studying the object of interest, 3) the focus with regard to characteristics of the object of interest, 4) who's perspective is to be supported by the goal, and 5) within which context or environment the object is to be studied.

After goal setting, a set of questions are identified for each goal to provide corroboration, clarity, and coverage of the different aspects of the goal. After question development, multiple metrics are identified for each question in the same manner. See FIG. 1 for an example of a Goal/Question/Metric tree related to Software Reliability using a known definition of software reliability [see J. A. McCall, "Specifications of Software Quality Attributes, Vols I, II, III", U.S. Rome Air Development Center Final Technical Report RADC-TR-85–37, 1985 Feb (herein referred to as "McCall")].

By following the above paradigm, the resulting measurement framework is goal-driven and maintainable via feedback from the "owners" of the goals, questions and metrics.

SUMMARY OF THE INVENTION

The present invention is a method for estimating software operation and performance in terms of measures such as software reliability using a goal/question/metric paradigm. In the present invention, the goal is associated with questions and metrics and stored to memory as a tree. The nodes in the tree are then interconnected in accordance with boolean logic relationships. A minimal path set and a minimal cut set are determined through the tree. Probabilities are then assigned to each node and used in assigning an overall probability to the top node or goal. A percentage contribution to the overall probability is then assigned to each node. The probabilities and percentage contributions are then used in determining an action plan to use during development of the software to ensure reliability accordingly.

In another aspect of the present invention, the percentage contributions are determined in accordance with a Vesely-Fussel Importance analysis.

In yet another aspect of the present invention, the action plan is generated in is accordance with a pareto analysis of the minimal path set and the minimal cut set.

These and other features of the invention that will be apparent to those skilled in the art from the following detailed description of the invention, taken together with the accompanying drawings.

DETAILED DESCRIPTION OF THE INVENTION

Figure 1:
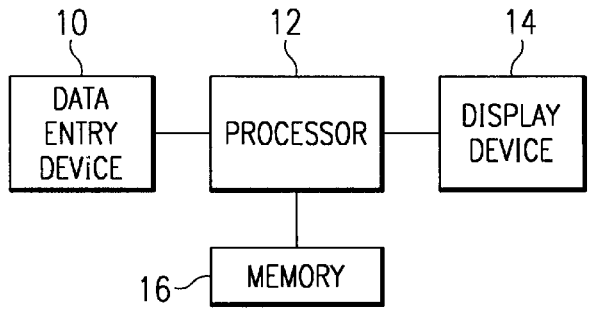
FIG. 1 is a block diagram of a computer system operable to implement the present invention.

FIG. 1 illustrates a computer system operable to execute the present invention. The system shown in FIG. 1 includes a data entry device 10, a processor 12, a memory 16 and a display device 14. It is contemplated that the data entry device 10 includes a keyboard or a mouse and that the display device 14 includes a printer or a CRT.

Although discussed in terms of the software reliability measure, it is contemplated that the present invention is applicable to estimating several other software operation and performance measures including software quality, software productivity, software maintainability, etc.

Analyzing several Goal/Question/Metric groupings, it is clear that these groupings can be viewed as "trees" similar to reliability success and fault trees. As discussed in Modarres [see M. Modarres, What Every Engineer Should Know About Reliability and Risk Analysis, 1993 Marcel Dekker, Inc. (herein referred to as "Modarres")], these reliability success and fault trees are fundamentally based on probabilistic trees which are described in Vesely [see W. E. Vesely, Fault Tree Handbook, 1981; U.S. Nuclear Regulatory commission NUREG-0492 (herein referred to as "Vesely")].

Figure 2:
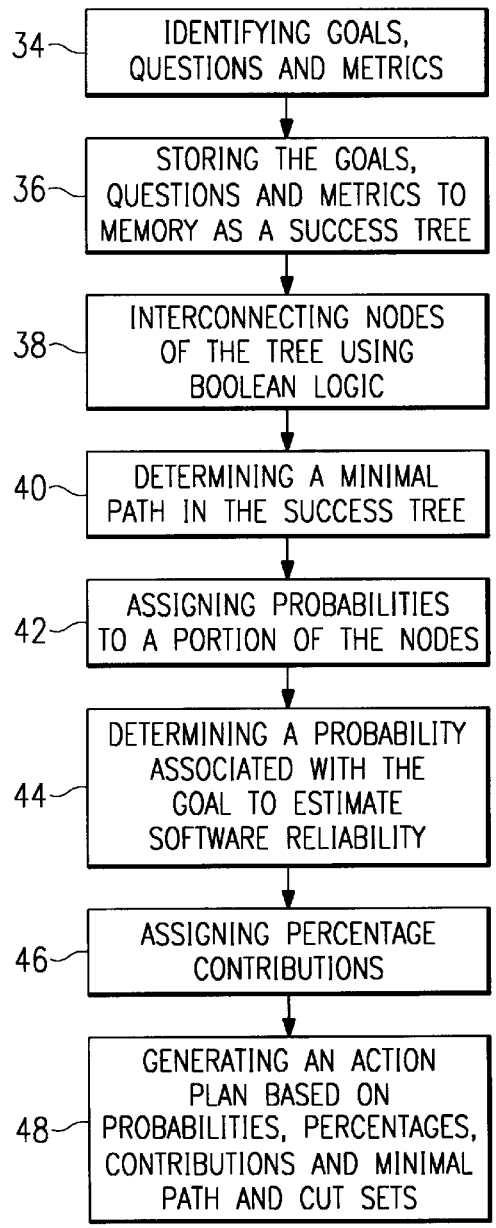
FIG. 2 illustrates a flow diagram showing operation of the present invention.

As shown at block 34 in the flow diagram in FIG. 2, in the present invention a tree begins with identification of a desired state or condition, a goal, as a top node. The different scenarios, situations or conditions that are directly prerequisite to the achievement of the top node are then determined. Each of these prerequisite scenarios, situations or conditions are then labeled as sub-nodes and are interconnected to the top node. Proceeding on, each of the new sub-nodes is then analyzed for it's own prerequisite scenarios, situations or conditions which then become sub-nodes to the current sub-node. The resulting tree, which is shown in FIG. 3, is then stored in memory 16 at block 36.

As shown at block 38, the nodes are then interconnected together in accordance with boolean logic relationships. A minimal path set, in the case of a success tree, or a minimal cut set, in the case of a fault tree, discussed in more detain hereinbelow, is then determined as shown at block 40. Probabilities are then assigned to a portion of the nodes at block 42. These probabilities are used to determine an overall probability, as shown at block 44, assigned to the top node or goal to estimate software reliability. At block 46, a percentage contribution to the overall probability is assigned to each of the nodes. Then, at block 48, in accordance with the probabilities, minimal path set or minimal cut set, and the percentage contributions, an action plan to use in developing the software accordingly is generated.

Figure 3:
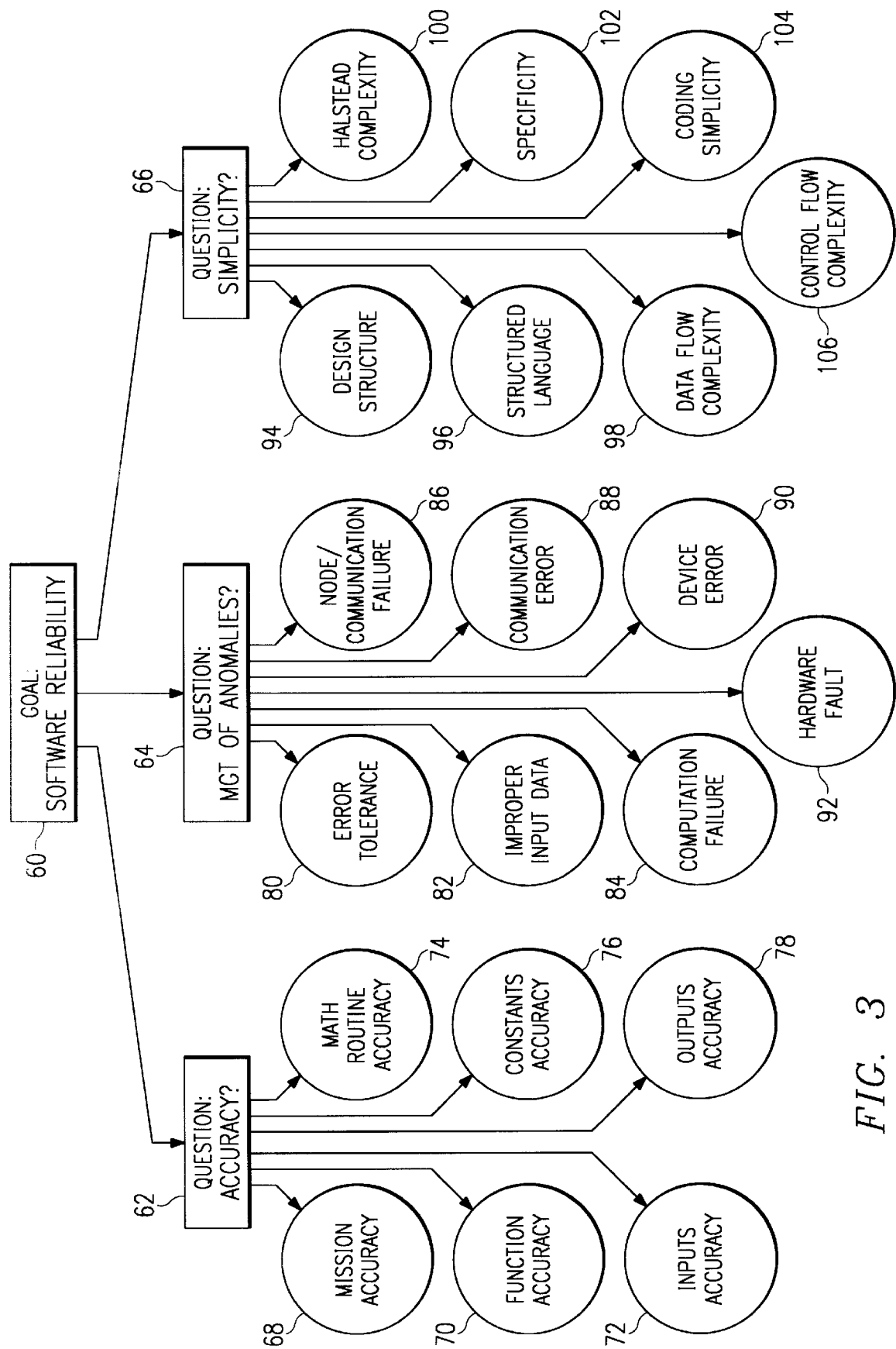
FIG. 3 shows an exemplary goal/question/metric groupings as a tree.
Figure 4:
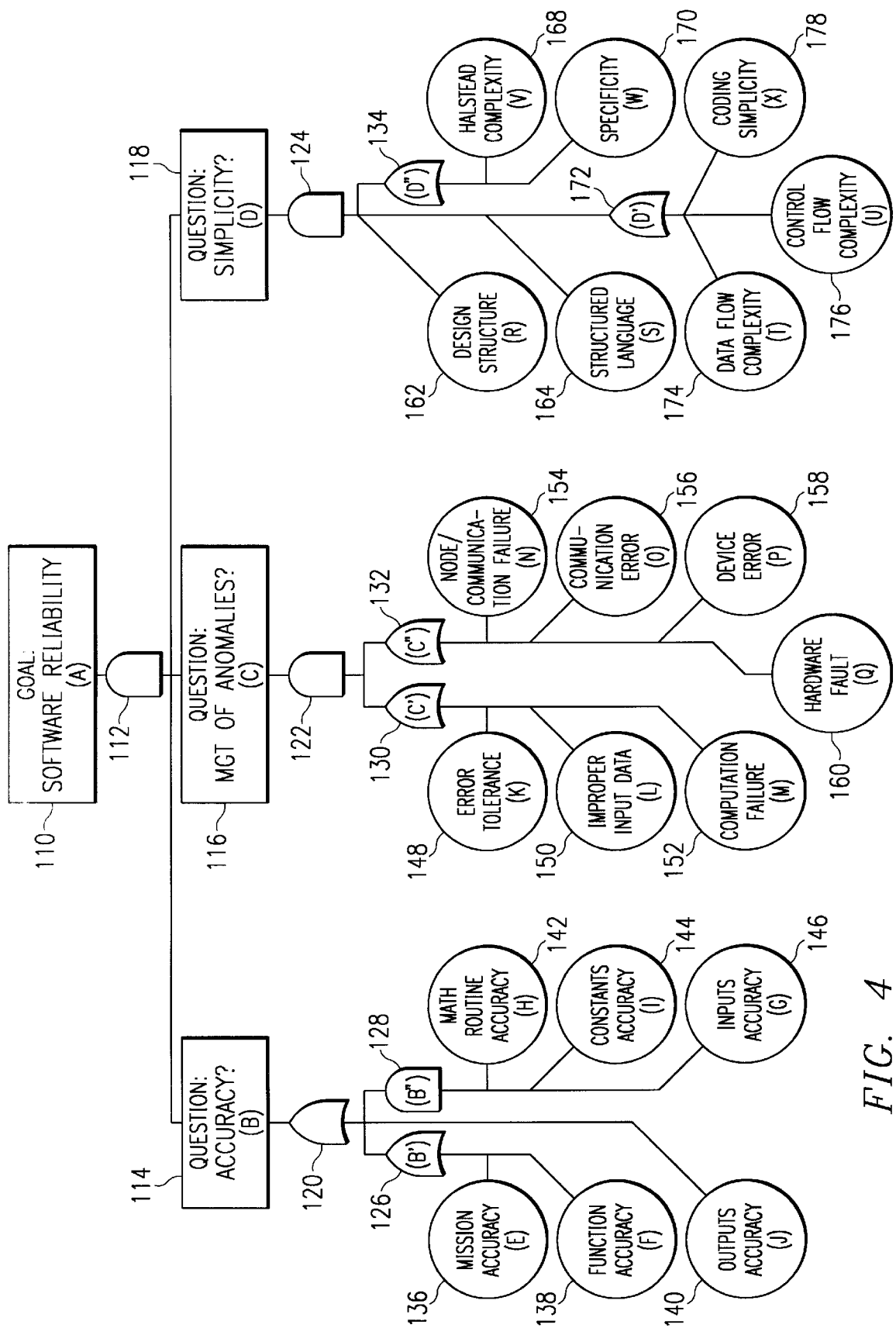
FIG. 4 is an exemplary success tree generated using the tree shown in FIG. 3.

As shown in FIG. 4, the Goal/Question/Metric "tree" in FIG. 3 is transformed into a success tree by the addition of boolean logic which represents the user's multiple forms of satisfaction for meeting software reliability. The success tree provides the ability to incorporate simple and complex boolean logic relationships within the Goal/Question/Metric groupings to account for complex and varied definitions of software reliability. This is helpful in situations in which multiple people or roles define the same goal differently or in situations in which an organization or team is faced with many users or customers with overlapping goals, questions, or metrics.

In the exemplary success tree shown in FIG. 4, an estimation of software reliability is defined to be the accomplishment of positively answering the questions on accuracy, management of anomalies, and simplicity.

Achievement of accuracy is defined to be the accomplishment of at least one of the following:
1) Either mission accuracy or function accuracy; or
2) Output Accuracy; or
3) Achievement of inputs accuracy, outputs accuracy, constants accuracy, and math routine library accuracy.

Achievement of management of anomalies occurs with the successful attainment of both of the following:
1) At least one of: error tolerance handled, improper input data handled, or computation failures handled; and
2) At least one of: hardware faults handled, device errors handled, communication errors handled, or node errors handled.

Achievement of simplicity occurs with the successful attainment of all four of the following:

1) Design Structure; and
2) Structured Language; and
3) At least one of: satisfactory data flow complexity, satisfactory control flow complexity or code simplicity; and
4) At least one of: satisfactory Halstead complexity or specificity.

Alternatively, the analysis is began by identifying a top node labeled "Lack of Software Reliability". In this case, a "fault" condition rather than a "success" condition is determined and a fault tree in which subsequent layers of nodes represent prerequisite scenarios, situations or "fault" conditions that could cause the "fault" in the parent node are developed.

It may be shown in Modarres and Vesely, that a fault tree is converted into a success tree via boolean algebra and vice versus. This is important because in some instances it is beneficial to present the Goal/Question/Metric groupings in "fault" or "failure" terms while in others it is beneficial to present the groupings in terms of "prerequisites for success". Consequently, either of the two method may be used.

Once a success or fault tree form of a Goal/Question/Metric grouping is established, minimal path and cut sets, respectively, are identified. If using a success tree, then the minimal path set identifies the unique ways in which the success node "Software Reliability" is achieved. If using a fault tree, then the minimal cut set identifies the unique ways in which the fault node "Lack of Software Reliability" occurs.

Figure 5:
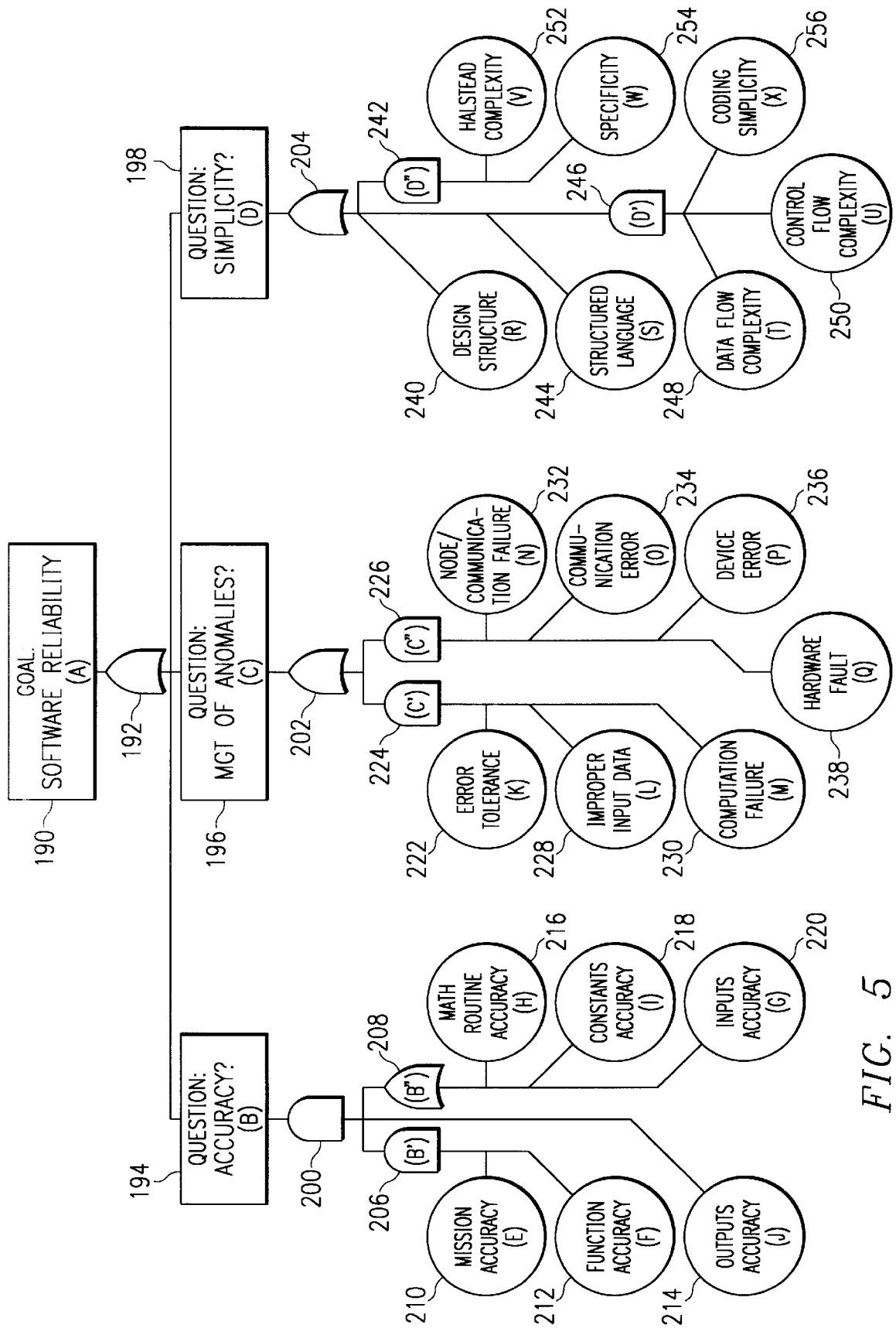
FIG. 5 is an exemplary fault tree generated using the success tree shown in FIG. 4.

As shown in FIG. 4 and in Table 1, the minimal path set for the exemplary success tree includes two hundred eighty eight (288) separate, unique ways to achieve software reliability. As shown in FIG. 5 and Table 2, an equivalent fault tree for software reliability is developed along with it's minimal cut set of nine (9) cuts. Thus, the number of ways to identify "Lack of Software Reliability "(9 cuts) is not the same as the number of ways to identify "Software Reliability" (288 paths).

TABLE 1

Exemplary Success Tree Analyzed

P(A) = P(B) * P(C) * P(D)
P(B) = P(B') + P(B") + P(J)
    P(B') = P(E) + P(F)    P(B") = P(G) * P(H) * P(I)
P(B) = P(E) + P(F) + [P(G) * P(H) * P(I)] + P(J)
P(C) = P(C') * P(C")
    P(C') = P(K) + P(L) + P(M) P(C") = P(N) + P(O) + P(P) + P(Q)
P(C) = [P(K) * P(N)] + [P(K) * P(O)] + [P(K) * P(P)] + [P(K) * P(Q)] +
    [P(L) * P(N)] + [P(L) * P(O)] + [P(L) * P(P)] + [P(L) * P(Q)] +
    [P(M) * P(N)] + [P(M) * P(O)] + [P(M) * P(P)] + [P(M) * P(Q)]
P(D) = P(R) * P(S) * P(D') * P(D")
    P(D') = P(T) + PU) + P(X)    P(D") = P(V) + P(W)
P(D) = [P(R) * P(S) * P(T) * P(V)] + [P(R) * P(S) * P(T) * P(W)] +
    [P(R) * P(S) * P(U) * P(V)] + [P(R) * P(S) * P(X) * P(W)] +
    [P(R) * P(S) * P(X) * P(V)] + [P(R) * P(S) * P(X) * P(W)]
SUBTREE B HAS 4 PATHS; SUBTREE C HAS 12 PATHS;
AND SUBTREE D HAS 6 PATHS
CONSEQUENTLY, TREE A HAS 4 * 12 * 6 = 288 PATHS
AN EXAMPLE PATH FOR SUCCESS WOULD BE SUCCESS OF
G,H,I,K,Q,R,S,T,W

TABLE 2

Exemplary Fault Tree Analyzed

P(NOT A) = P(NOT B) + P(NOT C) + P(NOT D)
P(NOT B) = P(NOT B') * P(NOT B") * P(NOT J)
    P(NOT B') = P(NOT E) * P(NOT F)
    P(NOT B") = P(NOT G) + P(NOT H) + P(NOT I)

TABLE 2-continued

Exemplary Fault Tree Analyzed

P(NOT B) = [P(NOT J) * P(NOT E) * P(NOT F) * P(NOT G)] +
    [P(NOT J) * P(NOT E) * P(NOT F) * P(NOT H)] +
    [P(NOT J) * P(NOT E) * P(NOT F) * P(NOT I)]
P(NOT C) = P(NOT C') + P(NOT C")
    P(NOT C') = P(NOT K) * P(NOT L) * P(NOT M)
    P(NOT C") = P(NOT N) * P(NOT O) * P(NOT P) * P(NOT Q)
P(NOT C) = [P(NOT K) * P(NOT L) * P(NOT M)] +
    [P(NOT N) * P(NOT O) * P(NOT P) * P(NOT Q)]
P(NOT D) = P(NOT R) + P(NOT S) + P(NOT D') + P(NOT D")
    P(NOT D') = P(NOT T) * P(NOT U) * P(NOT X)
    P(NOT D") = P(NOT V) * P(NOT W)
P(NOT D) = P(NOT R) + P(NOT S) +
    [P(NOT T) * P(NOT U) * P(NOT X)] +
    P(NOT V) * P(NOT W)
SUBTREE B HAS 3 CUTS; SUBTREE C HAS 2 CUTS;
SUBTREE D HAS 4 CUTS; SUBTREE A HAS 3+2+4=9 CUTS

TABLE 3

Pareto Analysis Supports Action Plan

Pareto of Questions to Address:
    Simplicity
    Management of Anomalies
    Accuracy
Pareto of Component Measures Within Simplicity Question:
    Structured Language
    Design Structure the other elements By further analysis and attachment of probabilities to the leaf nodes of a fault or success tree, the overall probability of the occurrence of any node in the success or fault tree is determined. [see Modarres and Vesely] This aspect of success and fault trees is used to determine the probability of successful achievement of the software reliability goal and/or subordinate questions, as well as the alternative probability of unsuccessful achievement of the "Lack of Software Reliability" goal and/or subordinate questions.

Additionally, a Vesely-Fussell Importance analysis is performed on the nodes of success and fault trees to provide a quantitative understanding of the percentage contribution of the different nodes to the overall success or failure, respectively. [see Modarres and Vesely]

Lastly, a pareto analysis of the minimal paths is performed to assist in forming an action plan which is used during software development to ensure attainment of software reliability in accordance with the determined probabilities and percentage contributions.

Figure 6:
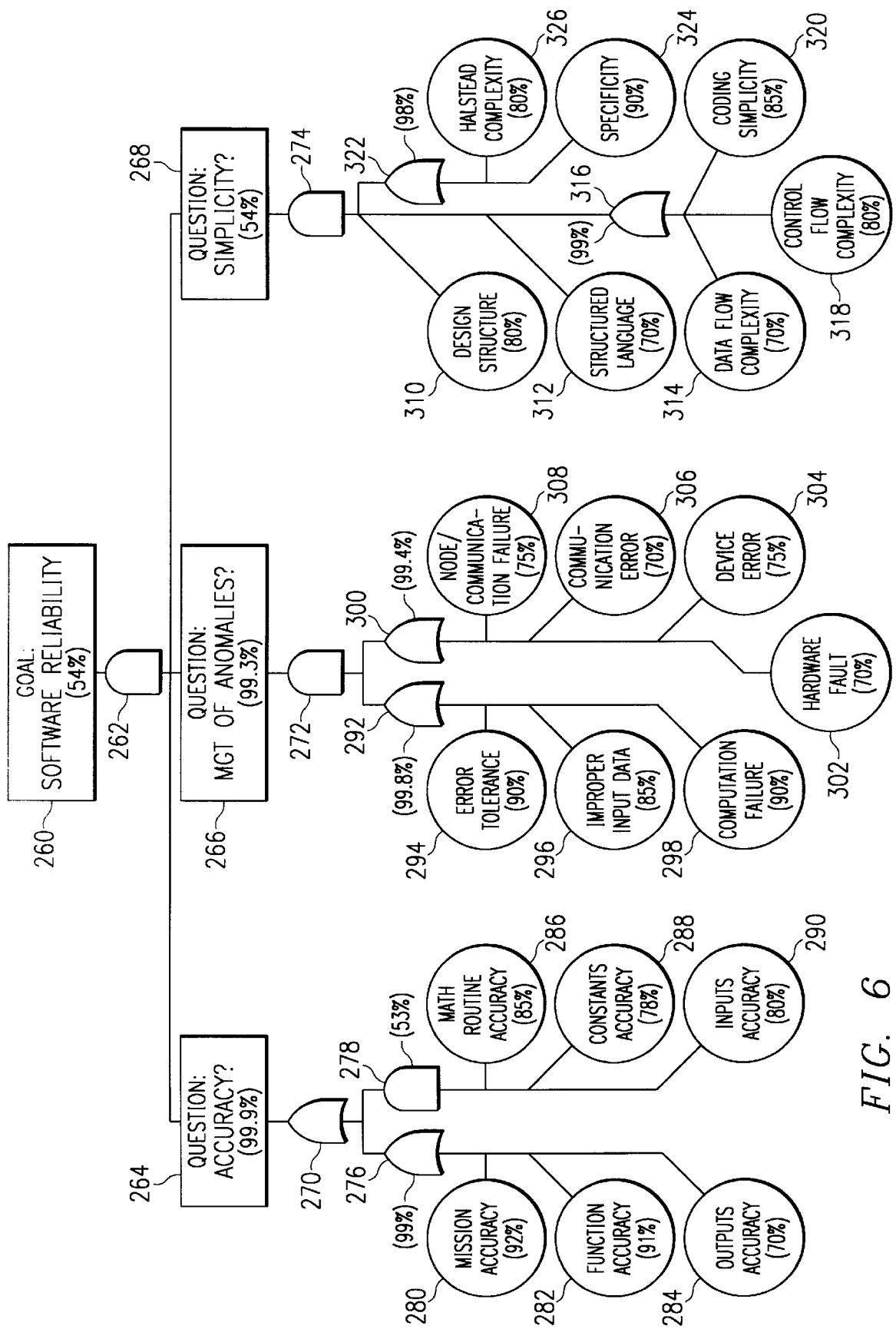
FIG. 6 shows an exemplary success tree with associated probabilities.

Based on the exemplary probabilities assigned to the success tree shown in FIG. 4, identification of significant nodes and an action plan based on the minimal path set is achieved as shown in FIG. 6 and Table 3. Although not shown, the same analysis can be done for the exemplary fault tree "Lack of Software Reliability" shown in FIG. 5 and the minimal cut set identified used as the basis for developing an action plan to prevent barriers to software reliability.

An instantiation of such a Goal-Question-Metric success tree in accordance with the present invention was implemented using a product called Reveal_W™ by Scientech, Inc., 11821 Parklawn Dr., Suite 100, Rockville, Md. USA 20852[(301) 468–6425]. The initial approach was to populate the success tree with Goal question-Metric groupings deduced from IEEE literature and then to use such a "strawman" as a starting point during future facilitation sessions aimed at identifying organizational software measures.

Additionally, the tool has been used to integrate different definitions and sets of questions and metrics from different users and customers of the organization. In that regard, one could begin to analyze priorities and risks associated with satisfying multiple customers or users in a Total Quality Management type approach.

The vendor product, originally designed to support hardware success tree logic, has proven quite adaptable for this purpose. It's colorful implementation of the success and fault trees enhances understanding and communication. In addition, various fields exist to handle the different sources of questions, metrics and probabilities.

Several demonstrations of this concept and tool were performed using a laptop computer, liquid plasma display and an overhead projector. Updating the tree in front of a group was advantageous to quickly and accurately capturing the many different perspectives on software quality and reliability. Immediate results show that the framework of success and fault tree logic assists in navigating through the Goal-Question-Metric process. Depending on the situation, success or fault logic helps prompt the Questions for the Goal and the Metrics for the Question.

Results have shown that this approach is quite useful for sensitivity (risk) analysis related to: 1) the ability to collect sufficient data for a defined goal, and 2) the ability to perform to established performance levels during software development. Results have also shown that a proactive action model can be derived from the success/fault tree analysis in that 1) corrective and preventive actions may be formulated for each of the cuts in the minimal cut set, and 2) assurance actions may be formulated for each of the paths in the minimal path set.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method for estimating software operation and performance measures, comprising the steps of:

identify a goal, associated questions, and associated metrics wherein said goal, said associated questions and said associated metrics relate to measurement of software operation and performance;

storing nodes which represent said identified goal, associated questions, and associated metrics to a memory;

interconnecting said nodes in accordance with boolean relationships between said goal, said associated questions, and said associated metrics to generate a success tree;

determining a minimal path set through said success tree;

assigning probabilities to said nodes of said success tree which represent said associated questions and said associated metrics;

determining a probability associated with said identified goal in accordance with said probabilities;

determining a percentage contribution of each of said nodes to said probability; and generating an action plan for use during development of said software in accordance with said probabilities -and said percentage contributions.

2. A method for estimating software operation and performance measures, comprising the steps of:

identifying a goal, associated questions, and associated metrics wherein said goal, said associated questions and said associated metrics relate to measurement of software operation and performance;

storing nodes which represent said identified goal, associated questions, and associated metrics to a memory;

interconnecting said nodes in accordance with boolean relationships between said goal, said associated questions, and said associated metrics to generate a success tree;

determining a minimal path set through said success tree;

assigning probabilities to said nodes of said success tree which represent said associated questions and said associated metrics;

determining a probability associated with said identified goal in accordance with said probabilities;

determining a percentage contribution of each of said nodes to said probability; and generating an action plan for use during development of said software in accordance with said probabilities and said percentage contributions;

said step of determining a percentage contribution includes the step of determining said percentage contribution in accordance with a Vesely-Fussel Importance analysis.

3. A method for estimating software operation and performance measures, comprising the steps of:

identifying a goal, associated questions, and associated metrics wherein said goal, said associated questions and said associated metrics relate to measurement of software operation and performance;

storing nodes which represent said identified goal, associated questions, and associated metrics to a memory;

interconnecting said nodes in accordance with boolean relationships between said goal, said associated questions, and said associated metrics to generate a success determining a minimal path set through said success tree:

assigning probabilities to said nodes of said success tree which represent said associated questions and said associated metrics;

determining a probability associated with said identified goal in accordance with said probabilities;

determining a percentage contribution of each of said nodes to said probability; and generating an action plan for use during development of said software in accordance with said probabilities and said percentage contributions;

said step of generating an action plan includes the step of generating said action plan in accordance with a pareto analysis of said minimal path set.

4. The method of claim 1 wherein said software operation and performance measures include software reliability measures.

5. The method of claim 1 wherein said software operation and performance measures include software quality measures.

6. The method of claim 1 wherein said software operation and performance measures include software productivity measures.

7. The method of claim 1 wherein said software operation and performance measures include software maintainability measures.

* * * * *